Jan. 31, 1961  C. J. GLOWZINSKI ET AL  2,970,209
LAMP ASSEMBLY
Filed Aug. 14, 1958
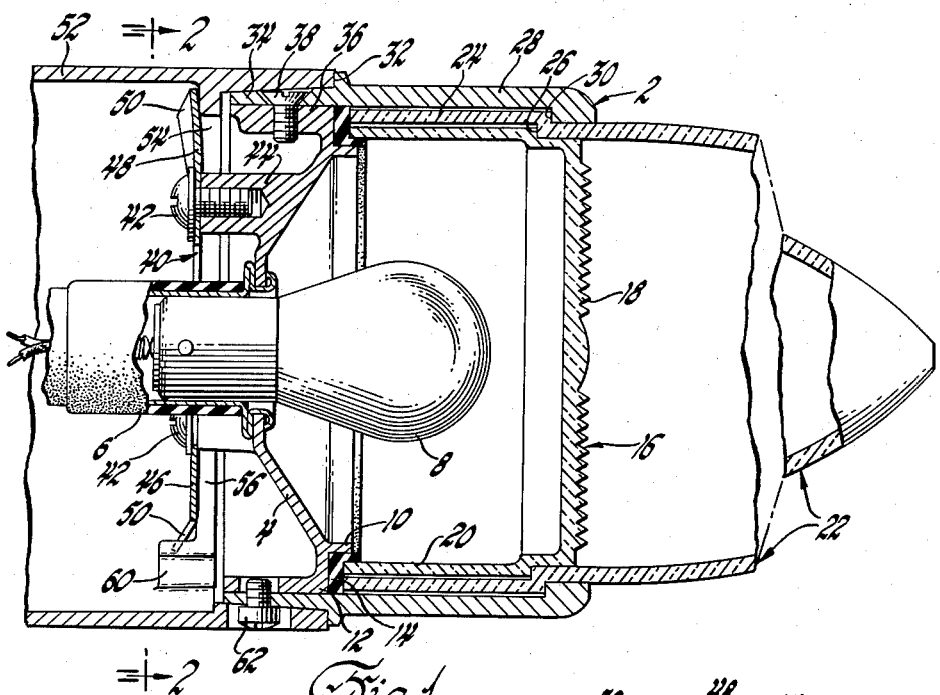
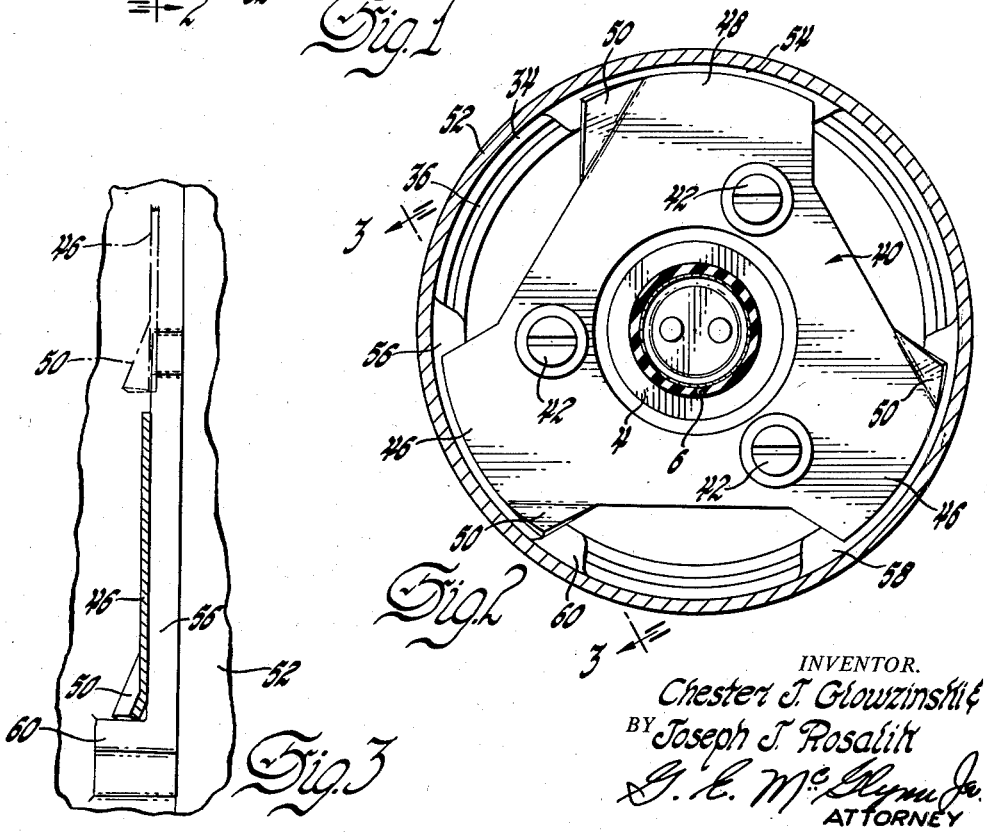
INVENTOR.
Chester J. Glowzinski
BY Joseph J. Rosalik
G. E. McGlynn Jr.
ATTORNEY

United States Patent Office 2,970,209
Patented Jan. 31, 1961

2,970,209

LAMP ASSEMBLY

Chester J. Glowzinski, Dearborn, and Joseph J. Rosalik, Detroit, Mich., assignors to General Motors Corporation, Detroit, Mich., a corporation of Delaware Filed Aug. 14, 1958, Ser. No. 755,056

2 Claims. (Cl. 240—52.1)

This invention pertains to a lamp assembly and, in particular, to such an assembly including means for removably mounting the entire assembly on a suitable support.

With respect to vehicular lamp assemblies of the type comprising a lamp body and lens secured together and enclosing a light source, it has been the usual practice to mount the assembly by directly bolting the lamp body to a suitable mounting bracket to be disposed on the vehicle body structure, or directly to the latter-named structure itself. In some instances, it has been possible to preassemble the lamp followed by bolting of the lamp body to the mounting structure. In other situations, it has been necessary to bolt the lamp body directly to the vehicle, and then assemble thereto the lamp lens.

It is an object and feature of this invention to provide a lamp assembly and mounting therefor in which the lamp may be completely pre-assembled and then readily mounted on a suitable support, such as a mounting bracket to be retained on a vehicle body or directly to the vehicle body itself.

It is another object and feature of this invention to provide a mounting means for a pre-assembled lamp structure which permits the lamp structure to be removably mounted on a suitable support structure.

It is still another object and feature of this invention to provide a lamp structure of the type aforementioned with mounting means to facilitate the proper location and retention of the structure on a suitable support.

In general, these and other objects of this invention are attained in a structure comprising a lamp body and lens secured together and enclosing a light source so as to form a complete lamp assembly. The lamp body has secured thereto a spring or yieldable mounting plate having a plurality of radially outwardly projecting locking fingers or extensions. The support for the lamp assembly, which may be a mounting bracket or a body panel of an automotive vehicle for example, includes a support wall defining an opening for receiving the mounting plate. A plurality of spaced locking lugs are formed on the support wall so as to project radially inwardly into the aforementioned opening. Upon insertion of the lamp assembly into the opening defined by the support wall, the locking fingers pass between the spaced locking lugs and, upon rotation of the lamp assembly, cam into engagement with the locking lugs so as to firmly mount the lamp assembly. The dimensions of the locking fingers and the spacing between the locking lugs are such as to provide a self-positioning and locating feature whereby the lamp assembly is properly located on its support. A stop lug formed on one of the locking lugs is engageable with one of the locking fingers so as to limit rotation of the assembly during the mounting operation.

These and other objects and features of this invention will become more apparent hereinafter as the description of the invention proceeds, and in which reference is made to the following drawings in which:

Figure 1 is a fragmentary longitudinal section taken through a preferred embodiment of the invention;

Figure 2 is a view taken on line 2—2 of Figure 1; and

Figure 3 is a view taken on line 3—3 of Figure 2.

Referring now to the drawings, the lamp assembly 2 includes a generally cup-shaped metallic lamp body 4 having a central cavity or depression in which there is rigidly mounted a socket assembly 6 adapted to receive the base of a suitable light source such as the conventional bulb 8. Inasmuch as it in and of itself forms no part of the present invention, it will suffice to observe that the socket assembly 6 includes the usual contacts connected by electrical conductors to a power source such as an automotive vehicle battery, while the light bulb includes corresponding contacts for cooperation with the socket contacts.

Adjacent its periphery, the lamp body is provided with an axial annular shoulder 10 and radial mounting flange 12 for an annular lens gasket 14. An inner cup-shaped lens 16 includes a face 18 which may be provided with prismatic rings or other optical configurations for distribution of the light emanating from the source 8. The terminal edge of the annular side wall 20 of the lens 16 seats against the gasket 14.

An outer lens 22 includes an annular side wall 24, the terminal end or edge of which rests against the gasket 14. The inner and outer lenses aforementioned each include cooperating annular shoulders which mate at 26, whereby the outer lens will retain the inner lens in compressive engagement with the gasket 14.

In order to secure the outer lens to the lamp body 4 and thereby also secure the inner lens to the body, there is provided an annular bezel or door 28 having an annular locking shoulder 30 seating against a similar shoulder on the exterior surface of side wall 24 of the outer lens. At its opposite end, the bezel is provided with a radially outwardly projecting annular stop shoulder 32 adjacent an annular skirt 34 which overlies and mates with the annular axially projecting rim 36 on the lamp body. A plurality of spaced fasteners, such as the flatheaded screws 38, fasten the bezel or door to the rim of the lamp body. As a result of this construction, the entire lamp assembly may be pre-assembled prior to mounting in a suitable support.

A yieldable spring mounting plate 40 is rigidly secured to the rear of the lamp body 4 as by the screws 42 passing therethrough and into axially rearwardly extending bosses 44 on the rear surface of the lamp body. The spring mounting plate is provided with a plurality, and herein specifically shown to be three, spaced radially outwardly projecting extensions or locking fingers 46 and 48. The locking fingers 46 are the same, while the finger 48 is slightly wider. One edge of each of the locking fingers, hereinafter referred to as the leading edge with respect to a description of the mounting of the assembly, is provided with a wing portion 50 bent outwardly from the mounting plate 40.

The lamp assembly is adapted to be removably mounted within an opening defined by the annular support wall 52 which may be a portion of a mounting bracket or, alternatively, a structural panel of an automotive vehicle. In either case, the support wall is provided with a plurality of spaced coplanar locking lugs 54, 56 and 58 projecting radially into the aforementioned opening. The spacing between the locking lugs 54 and 56, and between the latter and locking lug 58 is such as to permit respective passage of only the narrower locking fingers 46. On the other hand, the spacing between the locking lug 54 and locking lug 58 is larger than the spacings aforedescribed so as to permit entry only of the large or wider locking finger 48. One end of the locking lug 56 is provided with an integral axially projecting stop lug 60 cooperating with a locking finger 46 in a manner to appear more fully hereinafter. After the lamp assembly has been installed within the opening delineated by the support wall 52, apertures formed in the rim 36 of the lamp body, skirt 34 of the bezel and the support wall 52 become aligned so as to receive a retaining or locking screw 62.

With respect to a description of the mounting operation, it will be appreciated that the lamp assembly comprising the lamp body, lens and door or bezel are first pre-assembled. Thereafter, the spring mounting plate 40 is rigidly secured to the rear surface of the lamp body. In order to removably mount the assembly within the support wall opening, the rear of the lamp assembly is inserted within the opening defined by the support wall 52. As previously described, the spacing of the locking lugs 54 and 58 and the dimensions of the locking finger 48 are such as to permit entry of the assembly within the opening in only one position relative to the support wall. Upon properly aligning the locking fingers and locking lugs, the lamp assembly is projected inwardly into the opening until such time as the annular stop shoulder 32 on the door 28 abuts the forward edge of the support wall 52. The assembly is then rotated counterclockwise as viewed in Figure 3 to cause the respective wing portions 50 of each locking finger to ride past and progressively engage the respective locking lugs thereby leading the respective locking fingers into engagement with the associated locking lugs. It will be appreciated that the plane of mounting plate 40 is suitably positioned relative to the locking lugs and stop shoulder 32 so that the locking fingers 46 and 48 ultimately yieldably engage the locking lugs so as to bias the assembly inwardly of the opening with a spring pressure. Rotation of the assembly is limited by abutment of the wing portion 50 of locking finger 46 with the stop lug 60 thereby also aligning the aforementioned openings in the lamp door, lamp body and support wall so as to receive the screw 62.

In the particular lamp assembly illustrated, the optical grooves or rings on the face 18 of the inner lens 16 are shown to be symmetrical about the optical axis of the assembly. However, in those instances in which the optics are not so symmetrically disposed, the stop lug 60 may be so positioned as to automatically dispose the lens in the desired position from an optical standpoint in addition to preventing the locking fingers from riding past the locking lugs as in the embodiment shown.

Having disclosed a preferred embodiment of the invention, it is to be understood that this description is by way of illustration only, and in no way is intended to limit the scope of the invention which is defined by the claims which follow:

We claim:
1. The combination with a lamp assembly of the type comprising a lamp body and lens secured together and enclosing a light source, of means for mounting said assembly; said mounting means comprising yieldable means secured to the rear of said lamp assembly and including a plurality of spaced radially outwardly projecting locking fingers, one of said fingers being wider than the other of said fingers, a support wall defining an opening, a plurality of circumferentially spaced locking lugs on said wall projecting radially inwardly of said opening, the spacing of certain adjacent pairs of said locking lugs being such as to receive the respective narrower locking fingers and prevent entry therein of said wider locking finger upon insertion of said assembly into said opening, the spacing of another adjacent pair of said locking fingers being such as to receive the wider locking finger, said assembly being rotatable within said opening whereby said locking fingers engage said locking lugs to retain said assembly within said opening, and a stop lug within said opening abuttable with one of said fingers to limit rotation of said assembly.

2. The combination with a lamp assembly of the type comprising a lamp body and lens secured together and enclosing a light source, of means for mounting said assembly; said mounting means comprising a yieldable mounting plate secured to the rear of the said lamp body, a plurality of spaced radially outwardly projecting locking fingers on said plate, the leading edge of each of said fingers being bent outwardly from said plate to form a wing portion, a support wall defining an opening, a plurality of spaced substantially coplanar locking lugs on said wall projecting radially inwardly of said opening, the spacing of said locking lugs being such as to receive the respective locking fingers upon insertion of said assembly into said opening, said assembly being rotatable within said opening whereby said wing portions lead said locking fingers into engagement with said locking lugs to retain said assembly within said opening, and a stop lug within said opening abuttable with one of said fingers to limit rotation of said assembly.

References Cited in the file of this patent
UNITED STATES PATENTS

| | | |
|---|---|---|
| 1,656,648 | Ritz Woller | June 17, 1928 |
| 1,723,471 | Dunham | Aug. 6, 1929 |
| 2,844,274 | Kelish et al. | July 22, 1958 |

FOREIGN PATENTS

| | | |
|---|---|---|
| 1,096,497 | France | Feb. 2, 1955 |